US012633596B2

(12) United States Patent　　　(10) Patent No.:　US 12,633,596 B2
Rhim et al.　　　　　　　　　　　(45) Date of Patent:　May 19, 2026

(54) BATTERY PACK AND DEVICE INCLUDING THE SAME

(71) Applicant: LG ENERGY SOLUTION, LTD., Seoul (KR)

(72) Inventors: Soeun Rhim, Daejeon (KR); Haejin Kim, Daejeon (KR); Soon Chang Hong, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 519 days.

(21) Appl. No.: 18/010,747

(22) PCT Filed: Feb. 17, 2022

(86) PCT No.: PCT/KR2022/002332
§ 371 (c)(1),
(2) Date: Dec. 15, 2022

(87) PCT Pub. No.: WO2022/203209
PCT Pub. Date: Sep. 29, 2022

(65) Prior Publication Data
US 2024/0039084 A1　　Feb. 1, 2024

(30) Foreign Application Priority Data

Mar. 24, 2021　(KR) ........................ 10-2021-0038296

(51) Int. Cl.
H01M 10/658　　　(2014.01)
H01M 50/211　　　(2021.01)
(Continued)

(52) U.S. Cl.
CPC ....... H01M 10/658 (2015.04); H01M 50/211 (2021.01); H01M 50/258 (2021.01); H01M 50/317 (2021.01); H01M 50/383 (2021.01)

(58) Field of Classification Search
CPC ............. H01M 10/658; H01M 50/211; H01M 50/258; H01M 50/317; H01M 50/383; H01M 50/209
See application file for complete search history.

(56) References Cited

U.S. PATENT DOCUMENTS 9,917,286 B2　3/2018　Sugeno et al.
2011/0117401 A1　5/2011　Lee et al.
(Continued)

FOREIGN PATENT DOCUMENTS

CN　102747748 A　10/2012
CN　108695458 A　10/2018
(Continued)

OTHER PUBLICATIONS

Hario et al., "JP2013026090A English Translation", Feb. 4, 2013.*
(Continued)

*Primary Examiner* — Matthew T Martin
*Assistant Examiner* — Alexandra J Simmons
(74) *Attorney, Agent, or Firm* — Birch, Stewart, Kolasch & Birch, LLP

(57) ABSTRACT

A battery pack includes: a pack frame; a plurality of first battery modules installed on an upper portion of the pack frame; and a plurality of second battery modules installed on a lower portion of the pack frame, and a heat insulating member is attached to a lateral side of the first battery module disposed on an outermost side in the pack frame from among the first battery modules.

17 Claims, 6 Drawing Sheets

(51) Int. Cl.
    *H01M 50/258*     (2021.01)
    *H01M 50/317*     (2021.01)
    *H01M 50/383*     (2021.01)

(56)           References Cited

U.S. PATENT DOCUMENTS

| | | |
|---|---|---|
| 2013/0344369 A1 | 12/2013 | Miyakawa et al. |
| 2014/0234690 A1 | 8/2014 | Lee et al. |
| 2016/0049702 A1 | 2/2016 | Oishi et al. |
| 2020/0185672 A1 | 6/2020 | Seo et al. |
| 2021/0013560 A1 | 1/2021 | Lee et al. |

FOREIGN PATENT DOCUMENTS

| | | | | |
|---|---|---|---|---|
| JP | 2006-24536 A | 1/2006 | | |
| JP | 2013-26090 A | 2/2013 | | |
| JP | 2013026090 A | * 2/2013 | ............. | Y02E 60/10 |
| JP | 5362688 B2 | 12/2013 | | |
| JP | 2014154240 A | * 8/2014 | ............. | Y02E 60/10 |
| JP | 5664690 B2 | 2/2015 | | |
| JP | 2015-79655 A | 4/2015 | | |
| JP | 5822281 B2 | 11/2015 | | |
| JP | 2015-219984 A | 12/2015 | | |
| JP | 2016-24959 A | 2/2016 | | |
| JP | 2017-112032 A | 6/2017 | | |
| JP | 6443113-82 | 12/2018 | | |
| JP | 2019-29086 A | 2/2019 | | |
| JP | 2020-181699 A | 11/2020 | | |
| KR | 10-1488411 B1 | 2/2015 | | |
| KR | 10-2020-0085191 A | 7/2020 | | |
| KR | 10-2020-0104714 A | 9/2020 | | |
| TW | M535409 U | 1/2017 | | |
| WO | WO 2013/065285 A1 | 5/2013 | | |
| WO | WO 2017/104383 A1 | 6/2017 | | |

OTHER PUBLICATIONS

Ueda et al., "JP2014154240A English Translation", Aug. 25, 2014.*
International Search Report (PCT/ISA/210) issued in PCT/KR2022/002332 mailed on May 30, 2022.

* cited by examiner

【Figure 1】
100
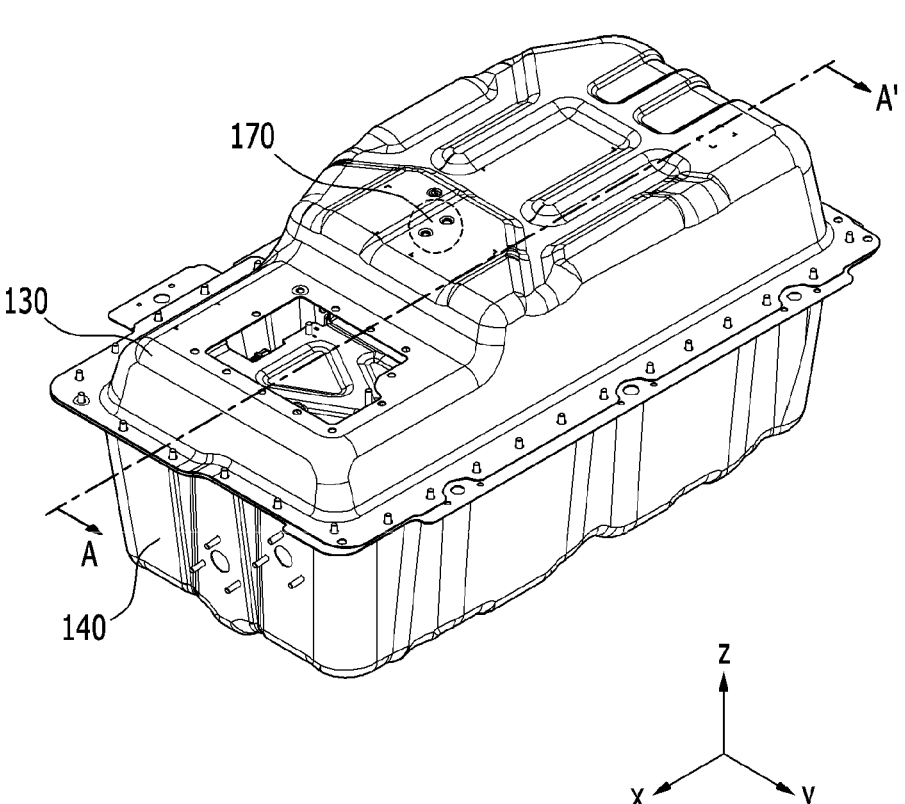

【Figure 2】
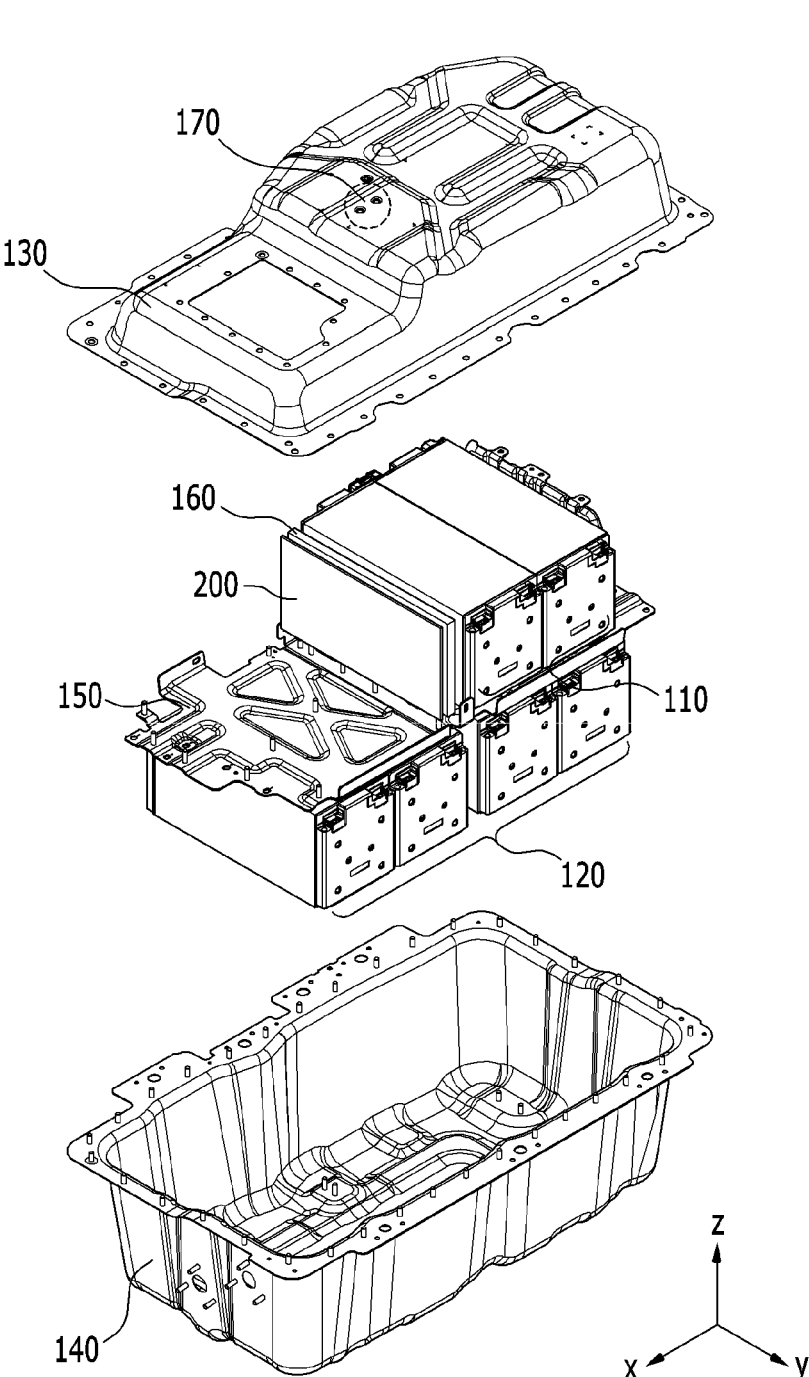

【Figure 3】
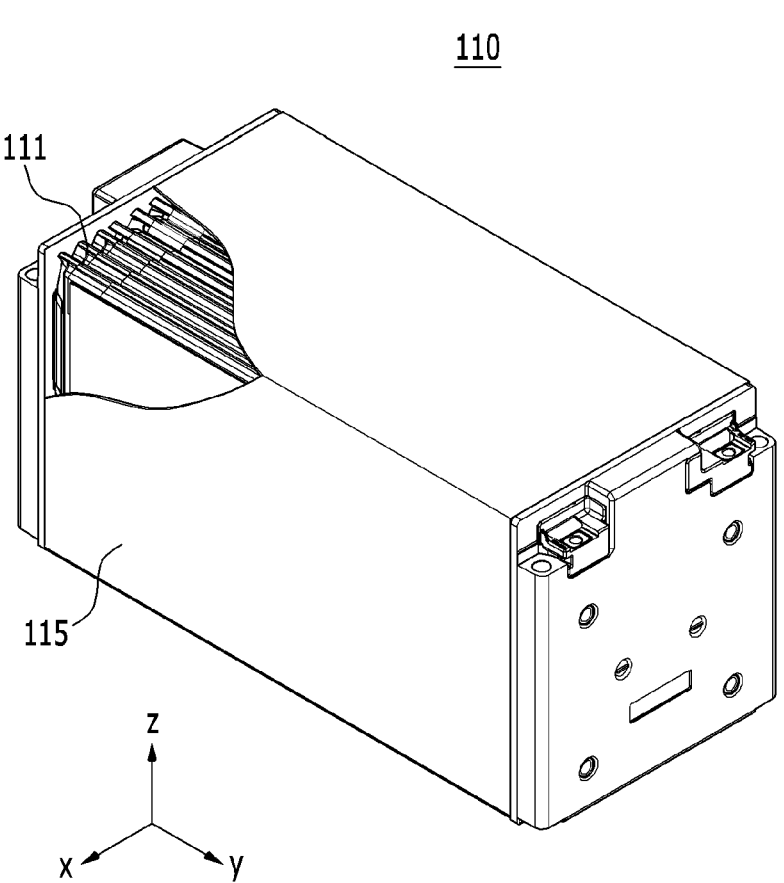

[Figure 4]
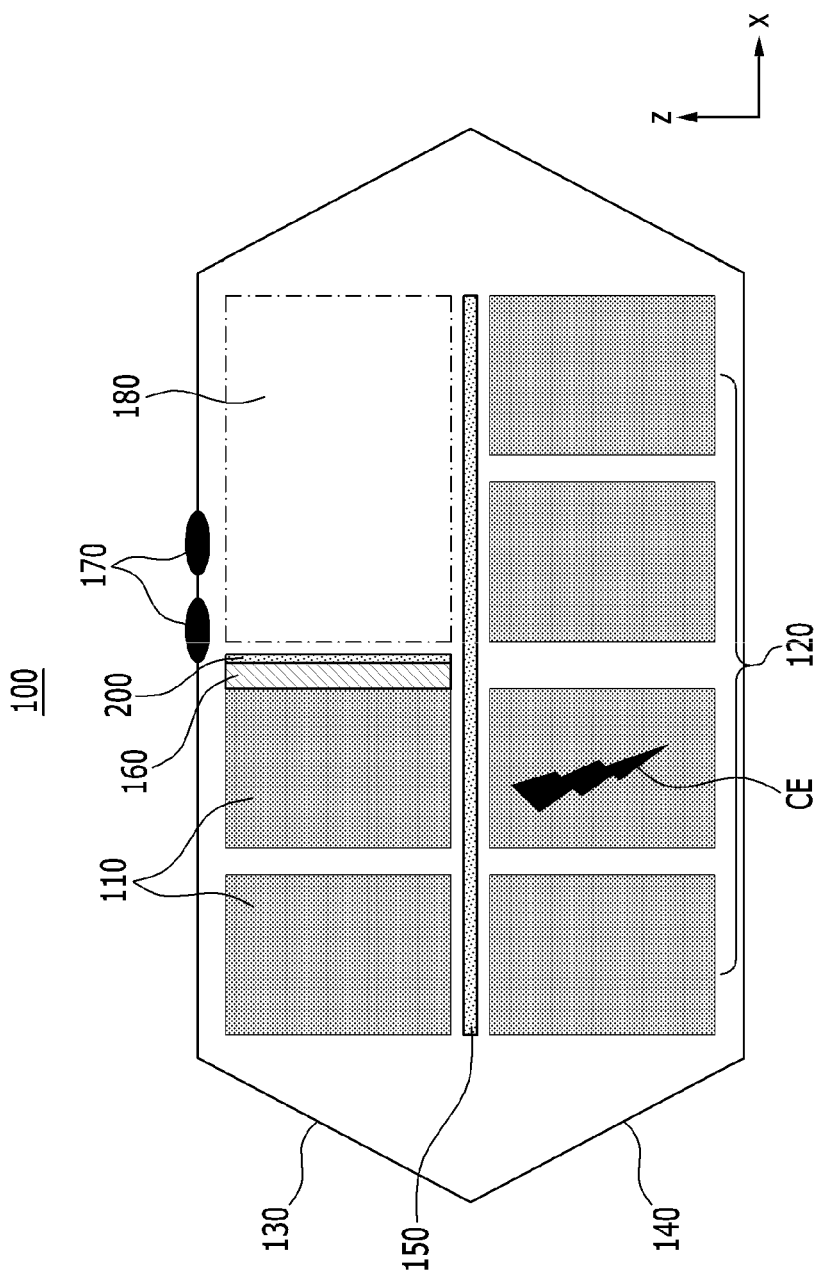

[Figure 5]
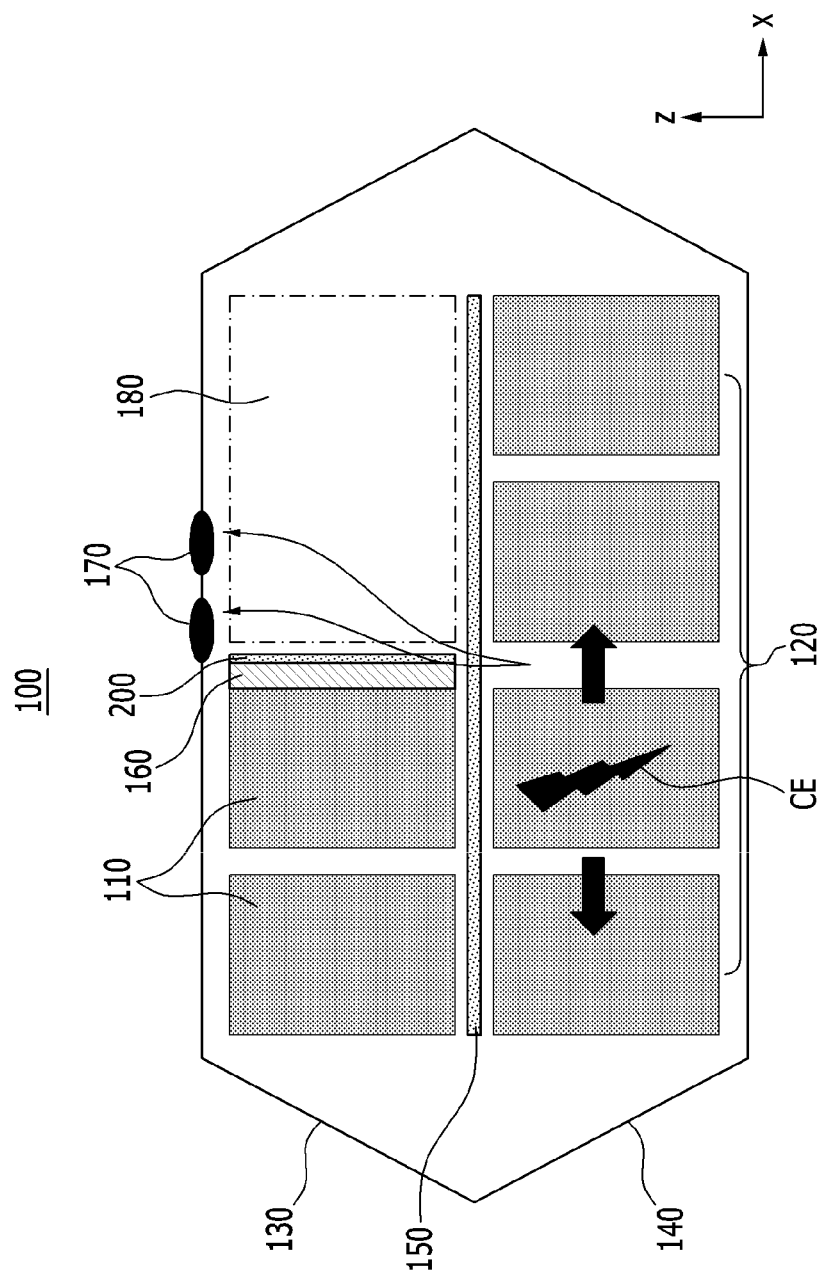

[Figure 6]
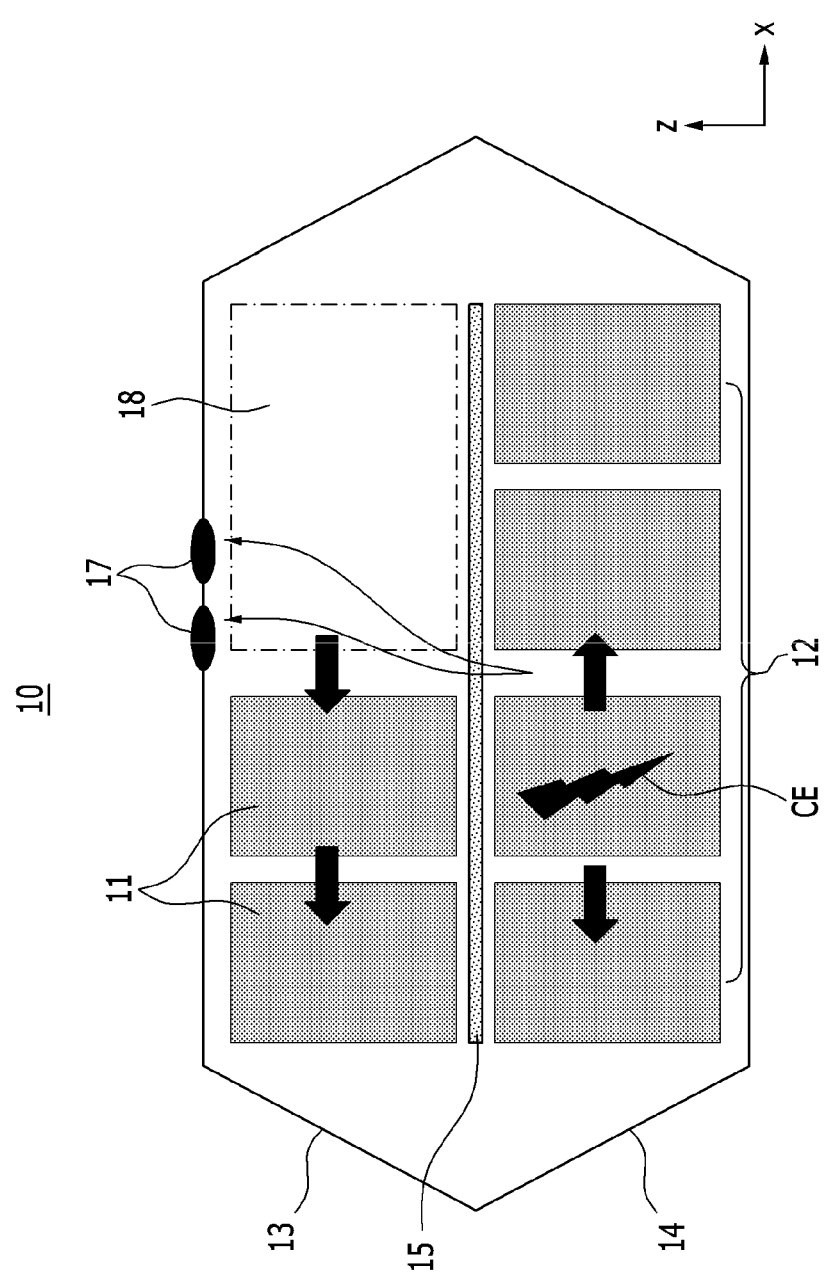

BATTERY PACK AND DEVICE INCLUDING THE SAME

TECHNICAL FIELD

This application claims priority to and the benefit of Korean Patent Application No. 10-2021-0038296 filed in the Korean Intellectual Property Office on Mar. 24, 2021, the entire contents of which are incorporated herein by reference.

The present invention relates to a battery pack and a device including the same, and particularly relates to a battery pack for delaying a heat propagation phenomenon between battery modules, and a device including the same.

BACKGROUND ART

Rechargeable batteries having high application characteristics and electrical characteristics such as high energy density according to their products are widely applied to battery vehicles, hybrid vehicles, and electric power storage devices driven by electric driving sources, as well as portable devices. These rechargeable batteries are attracting attention as new energy sources for improving environmental friendliness and energy efficiency in that they do not generate any by-products of energy use, as well as their primary merit that they can drastically reduce the use of fossil fuels.

The commercially available secondary batteries include a nickel cadmium battery, a nickel hydrogen battery, a nickel zinc battery, and a lithium secondary battery, and the lithium secondary battery among them scarcely generates a memory effect compared to the nickel-based secondary battery so it is freely charged and discharged, a self-discharge rate is very low, and an energy density is high.

In general, the lithium secondary battery may be classified into a cylindrical or square-type secondary battery of which the electrode assembly is installed in a metal can, and a pouch-type secondary battery of which the electrode assembly is installed in a pouch of an aluminum laminate sheet, depending on a shape of the exterior material.

Recently, as needs for a large-capacity secondary battery structure increase in addition to the use as an energy storing source of the secondary battery, needs for the battery packs in a medium to large module structure in which battery modules in which a plurality of secondary batteries are coupled in series or in parallel are gathered are increasing. Capacity and outputs of the battery modules are improved by coupling a plurality of battery cells in series or in parallel and configuring a battery cell stacked body. Further, a plurality of battery modules may configure a battery pack when installed together with various control and protection systems such as a battery management system (BMS) or a cooling system.

Particularly, the battery pack has a structure in which a plurality of battery modules are combined, so when some of the battery modules receive an overvoltage or an overcurrent or they are overheated, safety and operation efficiency of the battery pack may be problematic. Particularly, while the capacity of the battery pack is in the increasing trend to improve mileage and energy inside the pack is accordingly increasing, there is a need to design a structure satisfying reinforcing safety standards and obtaining safety of vehicles and drivers. For this purpose, the need for acquiring a structure for preventing an internal thermal runaway in advance, and minimizing corresponding damages when the thermal runaway is generated, is particularly on the rise.

DISCLOSURE

The present invention has been made in an effort to provide a battery pack for delaying a heat propagation phenomenon between battery modules, and a device including the same.

The technical problem to be solved of the present invention is not limited to the above-described problem, and problems not mentioned will be clearly understood by a person of ordinary skill in the art from the present specification and the accompanying drawings.

An embodiment of the present invention provides a battery pack including: a pack frame; a plurality of first battery modules installed on an upper portion of the pack frame; a plurality of second battery modules installed on a lower portion of the pack frame; and a heat insulating member disposed near a lateral side of an end battery module disposed on an outermost side in the pack frame from among the plurality of first battery modules.

The battery pack may further include a side plate disposed near the lateral side of the end battery module, wherein the heat insulating member may be attached to the side plate.

The battery pack may further include a horizontal plate disposed between a lower portion of the plurality of first battery modules and an upper portion of the plurality of second battery modules.

A gas fluid portion may be disposed on an upper portion of the pack frame, and the gas fluid portion may be disposed between the side plate and the horizontal plate.

A gas outlet may be formed on an upper side of the pack frame.

The gas outlet may be a gas valve penetrating toward an inside of the pack frame from the upper side of the pack frame.

The end battery module may be disposed near the gas outlet.

The lateral side of the end battery module is disposed nearest the gas outlet from among lateral sides of the end battery module.

A gas fluid portion may be disposed on an upper portion of the pack frame, and the gas outlet may be disposed on the gas fluid portion.

The gas fluid portion may be disposed between the heat insulating member and a lateral side of the pack frame.

The number of the second battery modules included in the plurality of second battery modules may be greater than the number of the first battery modules included in the plurality of first battery modules.

The gas fluid portion may be disposed on at least some second battery modules from among the plurality of second battery modules.

Another embodiment of the present invention provides a device including the above-described battery pack According to the embodiments, the battery pack according to the present invention and the device including the same may delay the heat propagation phenomenon between the battery modules in the pack frame because the heat insulating member is attached to the lateral side of the battery module positioned on the outermost side in the pack frame from among a plurality of battery modules installed on the upper portion of the pack frame.

The effects of the object of the present invention are not limited to the above-described effects, and effects not mentioned will be clearly understood by a person of ordinary skill in the art from the present specification and the accompanying drawings.

DESCRIPTION OF THE DRAWINGS

FIG. 1 shows a perspective view of a battery pack an embodiment of the present invention.

FIG. 2 shows an exploded perspective view of a battery pack of FIG. 1.

FIG. 3 shows a perspective view of first battery module included in a battery pack of FIG. 1.

FIG. 4 shows a cross-sectional view with respect to a line A-A' of FIG. 1.

FIG. 5 shows a heat propagation path when some battery modules generate cell events in a cross-section of FIG. 4.

FIG. 6 shows a heat propagation path when some battery modules generate cell events in a battery pack according to a comparative example.

MODE FOR INVENTION

The present invention will be described more fully hereinafter with reference to the accompanying drawings, in which embodiments of the invention are shown. As those skilled in the art would realize, the described embodiment may be modified in various different ways, all without departing from the spirit or scope of the present invention.

In order to clearly describe the present invention, parts that are irrelevant to the description are omitted, and identical or similar constituent elements throughout the specification are denoted by the same reference numerals.

The size and thickness of each element are arbitrarily illustrated for ease of description, and the present disclosure is not necessarily limited to those illustrated in the drawings. The thicknesses of layers, films, panels, regions, etc., are enlarged for clarity. The thicknesses of some layers and regions are exaggerated.

Unless explicitly described to the contrary, the word "comprise" and variations such as "comprises" or "comprising" will be understood to imply the inclusion of stated elements but not the exclusion of any other elements.

The phrase "in a plan view" or "on a plane" means viewing a target portion from the top, and the phrase "in a cross-sectional view" or "on a cross-section" means viewing a cross-section formed by vertically cutting a target portion from the side.

A battery pack according to an embodiment of the present invention will now be described. However, one cross-section of the battery pack will be a reference to be described, but is not limited thereto, and the entire battery pack may be described with the same or similar contents.

FIG. 1 shows a perspective view of a battery pack an embodiment of the present invention. FIG. 2 shows an exploded perspective view of a battery pack of FIG. 1.

Referring to FIG. 1 and FIG. 2, the battery pack 100 according to an embodiment of the present invention includes: pack frames 130 and 140; a plurality of first battery modules 110 mounted on upper portions of the pack frames 130 and 140; and a plurality of second battery modules 120 mounted on lower portions of the pack frames 130 and 140.

Here, the pack frames 130 and 140 may include an upper case 130 and a lower case 140 for receiving a plurality of first battery modules 110 and a plurality of second battery modules 120. For example, the upper case 130 and the lower case 140 may be fastened to each other by a bolt and nut combination.

Further, a lowest end of a plurality of first battery modules 110 may be positioned to be higher than a highest end of the second battery modules 120. For example, a plurality of first battery modules 110 and a plurality of second battery modules 120 may form a layered structure. In other words, a plurality of first battery modules 110 may be positioned on an upper layer, and a plurality of the second battery modules 120 may be positioned on a lower layer.

Further, the number of the second battery modules 120 included in a plurality of second battery modules 120 may be greater than the number of the first battery modules 110 included in a plurality of first battery modules 110. For example, as shown in FIG. 2, two first battery modules 110 may be positioned on the upper layer, and four second battery modules 120 may be positioned on the lower layer.

Accordingly, regarding the battery pack 100 according to the present embodiment, as a plurality of battery modules 110 and 120 are disposed in a layered structure, the battery modules 110 and 120 installed in the battery pack 100 may be disposed in a more compact way.

A horizontal plate 150 positioned between the lower portion of a plurality of first battery modules 110 and the upper portion of a plurality of second battery modules 120 may be further included. In other words, the horizontal plate 150 is provided between a plurality of first battery modules 110 positioned on the upper layer and a plurality of second battery modules 120 positioned on the lower layer, so a plurality of first battery modules 110 and a plurality of second battery modules 120 may be distinguished as a layered structure.

Accordingly, the battery pack 100 according to the present embodiment includes the horizontal plate 150 between a plurality of first battery modules 110 and a plurality of second battery modules 120 in the pack frames 130 and 140, thereby separating a space of the upper layer and the lower layer, and additionally obtaining durability of the battery pack 100. It may physically protect the battery modules 110 and 120 and other electronic units from external impacts.

Regarding the battery pack 100, a side plate 160 may be closely positioned on a lateral side of the first battery module 110 positioned on an outermost side in the pack frames 130 and 140 from among a plurality of first battery modules 110. In other words, the side plate 160 may contact the lateral side of the first battery module 110 positioned on the outermost side in the pack frames 130 and 140 from among a plurality of first battery modules 110. For example, the side plate 160 may be combined, engaged, or attached to the lateral side of the first battery module 110 positioned on the outermost side in the pack frames 130 and 140 from among a plurality of first battery modules 110.

Here, that which is positioned on the outermost side in the pack frames 130 and 140 may signify the first battery module 110 positioned on the outermost side when a plurality of first battery modules 110 are disposed in parallel to each other in the pack frames 130 and 140.

The lateral side of the first battery module 110 positioned on the outermost side in the pack frames 130 and 140 from among a plurality of first battery modules 110 may be exposed in the pack frames 130 and 140. However, in the present embodiment, the side plate 160 may be positioned on the lateral side of the first battery module 110 positioned on the outermost side in the pack frames 130 and 140 to physically protect the first battery module 110 positioned on the outermost side in the pack frames 130 and 140 from external impacts.

Regarding the battery pack 100, a heat insulating member 200 may be positioned near the lateral side of the first battery module 110 positioned on the outermost side in the pack frames 130 and 140 from among a plurality of first battery modules 110. In detail, the heat insulating member 200 may be attached to the side plate 160. The heat insulating member 200 may extend along an external side of the side plate 160.

For example, the heat insulating member 200 may be made of a material such as super wool. However, without being limited thereto, any types of heat insulating materials are usable.

Accordingly, in the present embodiment, when the heat and the high-temperature gas are generated in the pack frames 130 and 140, influences caused by the heat and the high-temperature gas in the pack frames 130 and 140 for the first battery module 110 positioned on the outermost side in the pack frames 130 and 140 may be minimized by the heat insulating member 200 attached to the side plate 160.

Further, a gas outlet 170 may be formed on upper sides of the pack frames 130 and 140. In detail, the gas outlet 170 may be formed on the upper side of the upper case 130 in the pack frames 130 and 140.

For example, the gas outlet 170 may be a gas valve penetrating toward insides of the pack frames 130 and 140 from the upper sides of the pack frames 130 and 140. For another example, the gas outlet 170 may be a gas valve penetrating toward the inside of the lower case 140 from the upper side of the upper case 130. However, a shape of the gas outlet 170 is not limited to the valve shape, and any shapes for discharging the gas in the pack frames 130 and 140 are allowable.

Accordingly, in the present embodiment, when heat and high-temperature gas are generated in the pack frames 130 and 140, the heat and high-temperature gas in the pack frames 130 and 140 may be discharged through the gas outlet 170.

Further, a gas fluid portion 180 may be positioned on the upper portions of the pack frames 130 and 140. In detail, the gas fluid portion 180 may be positioned on the upper portions of the pack frames 130 and 140, and the gas fluid portion may be positioned between the side plate 160 and the horizontal plate 150.

Further, the gas fluid portion 180 may be positioned on at least some second battery modules 120 from among a plurality of second battery modules 120 installed on the lower layer. In other words, the gas fluid portion 180 may signify a space in which a plurality of first battery modules 110 installed on the upper layers of the pack frames 130 and 140 are not positioned.

When an ignition event is generated by some battery modules 110 and 120, heat and high-temperature gas may be generated in the pack frames 130 and 140. Here, regarding the battery pack 100 according to the present embodiment, the gas fluid portion 180 may be positioned on the upper portions of the pack frames 130 and 140 to receive the heat and the high-temperature gas by the gas fluid portion 180. Hence, the gas fluid portion 180 may delay discharging of the heat and high-temperature gas in the pack frames 130 and 140 to the outside.

Further, the gas outlet 170 may be positioned on the gas fluid portion 180. That is, when an ignition event is generated by some battery modules 110 and 120, the heat and the high-temperature gas may move to the gas fluid portion 180 in the pack frames 130 and 140, and the heat and the high-temperature gas received into the gas fluid portion 180 may be discharged to the outside through the gas outlet 170.

Referring to FIG. 2, the first battery module 110 positioned on the outermost side in the pack frames 130 and 140 from among a plurality of first battery modules 110 may be positioned near the gas outlet 170. The heat insulating member 200 may be positioned on a lateral side provided near the gas outlet 170 from among the lateral side of the first battery module 110 positioned on the outermost side in the pack frames 130 and 140 from among a plurality of first battery modules 110. The gas fluid portion 180 may be positioned between the heat insulating member 200 and the lateral sides of the pack frames 130 and 140.

The first battery module 110 positioned on the outermost side in the pack frames 130 and 140 may be positioned near a path on which the heat and the high-temperature gas in the pack frames 130 and 140 are discharged through the gas outlet 170 and the gas fluid portion 180. However, because of the heat insulating member 200 attached to the side plate 160, the influence caused by the path on which the heat and the high-temperature gas are discharged for the first battery module 110 positioned on the outermost side in the pack frames 130 and 140 may be minimized.

FIG. 3 shows a perspective view of first battery module included in a battery pack of FIG. 1.

Referring to FIG. 3, in an embodiment of the present invention, the first battery module 110 may include a plurality of battery cells 111. In detail, the battery cells 111 may be stacked in a predetermined direction and may be installed in the module frame 115 to thus configure the first battery module 110.

The battery cells 111 have no specific limits in their types so they may be pouch-type rechargeable batteries or square-type rechargeable batteries, and they are preferably pouch-type rechargeable batteries.

The first battery module 110 has been exemplified to describe the battery module according to the present invention so it may have an equivalent or similar structure to the second battery module 120 (or the first battery module 110 described with reference to FIG. 2).

FIG. 4 shows a cross-sectional view with respect to a line A-A' of FIG. 1. FIG. 5 shows a heat propagation path when some battery modules generate cell events in a cross-section of FIG. 4.

Referring to FIG. 4 and FIG. 5, regarding the battery pack 100 according to the present embodiment, a cell event CE may be generated by some second battery modules 120 from among a plurality of second battery modules 120. Here, the cell event CE may signify that abnormal phenomena such as an overvoltage, an overcurrent, or overheating in the battery modules 110 and 120 are generated, and a high temperature and a gas are generated by the battery modules 110 and 120.

Hereinafter, it will be assumed that a cell event CE is generated by the second battery module 120, and a case in which the cell event CE is generated by the first battery module 110 will also be described in the same or similar way.

Referring to FIG. 4, it is found that the cell event CE is generated by some second battery modules 120 from among a plurality of second battery modules 120, regarding the battery pack 100 according to the present embodiment. Referring to FIG. 5, by the heat and the high-temperature gas generated by the second battery module 120 having generated the cell event CE, the cell event CE may be propagated to the adjacent second battery module 120.

A horizontal plate 150 may be positioned between a plurality of first battery modules 110 and a plurality of second battery modules 120, thereby preventing the heat and the high-temperature gas generated by the second battery module 120 having generated the cell event CE from directly being transmitted to the first battery module 110, or further delaying a transmitting time.

The high-temperature gas generated by the second battery module 120 having generated the cell event CE may move to the gas fluid portion 180 positioned in the pack frames 130 and 140, and the high-temperature gas having moved to the gas fluid portion 180 may be discharged to the outside through the gas outlet 170.

The first battery module 110 positioned on the outermost side in the pack frames 130 and 140 may be positioned near the path on which the high-temperature gas generated by the second battery module 120 having generated the cell event CE is discharged through the gas outlet 170 and the gas fluid portion 180.

However, as shown in FIG. 5, regarding the battery pack 100 according to the present embodiment, by the heat insulating member 200 attached to the side plate 160, the influence caused by the path on which the heat and the high-temperature gas are discharged for the first battery module 110 positioned on the outermost side in the pack frames 130 and 140 may be minimized. That is, the time for propagating the cell event CE may be efficiently delayed by minimizing heat transfer to the first battery module 110 from the second battery module 120 having generated the cell event CE.

FIG. 6 shows a heat propagation path when some battery modules generate cell events in a battery pack according to a comparative example.

Differing from what is described in the above, referring to FIG. 6, in the case of the battery pack 10 according to a comparative example, when a cell event CE is generated by some second battery modules 12 from among a plurality of second battery modules 12, the cell event CE may be propagated to the adjacent second battery module 12. As the high-temperature gas generated by the second battery module 12 moves to the gas fluid portion 18, heat caused by the high-temperature gas having moved to the gas fluid portion 18 may be transmitted to the first battery module 11 positioned on the outermost side in the pack frames 130 and 140.

That is, in the case of the battery pack 10 according to a comparative example, the first battery module 11 positioned on the outermost side in the pack frames 130 and 140 is easily exposed to the heat and the high-temperature gas in the pack frames 13 and 14 so the cell event CE generated by some battery modules 110 and 120 may be easily propagated. In comparison to this, as described above, the battery pack 100 according to an embodiment of the present invention may minimize heat transfer to the first battery module 110 from the second battery module 120 having generated the cell event CE, and may efficiently delay the time for propagating the cell event CE.

The battery pack according to the present embodiment may be applied to various devices. The devices include transport means such as electric bicycles, electric vehicles, and hybrid vehicles, but the present invention is not limited thereto, and it may be applied to various devices that use the battery module and the battery pack including the same, which also belongs to the scope of the present invention.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: battery pack
110: first battery module

120: second battery module
130: uppercase
140: lowercase
150: horizontal plate
160: side plate
170: gas outlet
180: gas fluid portion
200: heat insulating member

The invention claimed is:

1. A battery pack comprising:
a pack frame;
a plurality of first battery modules installed on an upper portion of the pack frame;
a plurality of second battery modules installed on a lower portion of the pack frame;
a heat insulating member disposed near a lateral side of an end battery module disposed on an outermost side in the pack frame from among the plurality of first battery modules; and
a gas fluid portion disposed on a first side of the upper portion of the pack frame,
wherein the plurality of first battery modules are disposed on a second side of the upper portion of the pack frame,
wherein the heat insulating member is disposed on one side of the plurality of first battery modules, and
wherein the gas fluid portion is disposed between the heat insulating member and a lateral side of the pack frame.

2. The battery pack of claim 1, further comprising a side plate disposed near the lateral side of the end battery module,
wherein the heat insulating member is attached to the side plate.

3. The battery pack of claim 2, further comprising a horizontal plate disposed between a lower portion of the plurality of first battery modules and an upper portion of the plurality of second battery modules.

4. The battery pack of claim 3, wherein the gas fluid portion is disposed between the side plate and the horizontal plate.

5. The battery pack of claim 1, wherein a gas outlet is formed on an upper side of the pack frame.

6. The battery pack of claim 5, wherein the gas outlet is a gas valve penetrating toward an inside of the pack frame from the upper side of the pack frame.

7. The battery pack of claim 5, wherein the end battery module is disposed near the gas outlet.

8. The battery pack of claim 7, wherein the lateral side of the outermost battery module is disposed nearest the gas outlet from among lateral sides of the end battery module.

9. The battery pack of claim 8, wherein the gas outlet is disposed on the gas fluid portion.

10. The battery pack of claim 9, wherein the number of the second battery modules included in the plurality of second battery modules is greater than the number of the first battery modules included in the plurality of first battery modules.

11. The battery pack of claim 10, wherein the gas fluid portion is disposed on at least some second battery modules from among the plurality of second battery modules.

12. A device comprising a battery pack according to claim 1.

13. The battery pack of claim 1, wherein a number of the plurality of first battery modules is less than a number of the plurality of second battery modules.

14. The battery pack of claim 1, wherein the pack frame comprises a lower case and an upper case.

15. The battery pack of claim 14, further comprising a horizontal plate disposed between a lower portion of the plurality of first battery modules and an upper portion of the plurality of second battery modules, wherein the gas fluid portion is formed between the side plate, the horizontal plate and the upper case, the gas fluid portion being spaced from the plurality of first battery modules.

16. The battery pack of claim 15, further comprising a gas outlet in a section of the upper case corresponding to the gas fluid portion.

17. The battery pack of claim 14, wherein the gas fluid portion is formed by the upper case, and wherein a height of a first section of the upper case corresponding to the plurality of first battery modules is greater than a height of a second section of the upper case corresponding to the gas fluid portion.

\* \* \* \* \*